(12) United States Patent
O'Neal

(10) Patent No.: US 9,688,095 B1
(45) Date of Patent: Jun. 27, 2017

(54) VEHICLE SAFETY WHEEL

(71) Applicant: William Tyson O'Neal, Frisco, TX (US)

(72) Inventor: William Tyson O'Neal, Frisco, TX (US)

( * ) Notice: Subject to any disclaimer, the term of this patent is extended or adjusted under 35 U.S.C. 154(b) by 575 days.

(21) Appl. No.: 14/249,351

(22) Filed: Apr. 9, 2014

Related U.S. Application Data

(60) Provisional application No. 61/810,201, filed on Apr. 9, 2013.

(51) Int. Cl.
*B60B 7/01* (2006.01)
*B60B 3/00* (2006.01)
*B60Q 1/32* (2006.01)

(52) U.S. Cl.
CPC .............. *B60B 3/004* (2013.01); *B60B 7/01* (2013.01); *B60Q 1/326* (2013.01)

(58) Field of Classification Search
CPC ..... B60B 7/0006; B60B 7/0053; B60B 3/004; B60B 3/005; B60B 7/01; B60Q 1/326; G09F 21/043; G09F 21/045
USPC ............................................ 362/500; 40/587
See application file for complete search history.

(56) References Cited

U.S. PATENT DOCUMENTS

| | | | | |
|---|---|---|---|---|
| 3,763,584 A * | 10/1973 | Falkenstein | ............ | G09F 23/00 40/587 |
| 6,030,106 A * | 2/2000 | Johnson | ................. | A63C 17/26 362/464 |
| 6,322,237 B1 * | 11/2001 | Lee | ......... | B60Q 1/326 362/234 |
| 6,386,731 B1 * | 5/2002 | Cheng | ..................... | F21L 4/022 362/183 |
| 7,452,036 B1 * | 11/2008 | Sulahian | ................... | B60B 7/01 301/37.108 |
| 7,537,289 B2 * | 5/2009 | Diko | ........................ | B60B 7/01 301/37.108 |
| 2002/0113485 A1 * | 8/2002 | Ketter | ..................... | B60B 7/006 301/37.108 |
| 2003/0151924 A1 * | 8/2003 | Gloodt | .................. | B60Q 1/326 362/500 |
| 2003/0169594 A1 * | 9/2003 | Khan | ..................... | B60Q 1/326 362/500 |
| 2004/0218397 A1 * | 11/2004 | Luo | ......................... | B60B 7/006 362/500 |
| 2007/0058385 A1 * | 3/2007 | Chen | ..................... | B60Q 1/326 362/500 |

(Continued)

*Primary Examiner* — Julie Bannan
(74) *Attorney, Agent, or Firm* — Mark W Handley

(57) ABSTRACT

A vehicle safety wheel is disclosed having a central disk and a rim concentrically disposed around the central disk. The central disk is compatible for mounting to a vintage hub with conventional wheel mounting hardware. The rim has an inboard flange and an outboard flange for mounting a tire to the rim, and an inner flange disposed inwardly of the outboard flange, concentric with the outboard flange for defining an annular-shaped space there-between. A fascia is adapted for mounting in the annular-shaped space, circumferentially extending between the outboard flange and the inner flange, with the fascia forming a visually continuous surface with a sidewall of the tire. The fascia may be embedded with a light source which is controlled in brightness and flashing by one of an accelerometer, a gyroscope, a brake sensor, and a turn sensor.

18 Claims, 15 Drawing Sheets

(56) References Cited

U.S. PATENT DOCUMENTS

| | | | |
|---|---|---|---|
| 2008/0105344 A1* | 5/2008 | Losey | B60C 13/001 152/152.1 |
| 2008/0105345 A1* | 5/2008 | Fenkanyn | B60C 19/001 152/152.1 |
| 2010/0097448 A1* | 4/2010 | Gilbert | B60K 35/00 348/51 |
| 2011/0176322 A1* | 7/2011 | Lin | B60Q 1/326 362/464 |
| 2012/0223571 A1* | 9/2012 | Clark, II | B60B 7/006 301/37.25 |
| 2015/0028659 A1* | 1/2015 | Jabourian | B62J 6/20 301/37.24 |

* cited by examiner

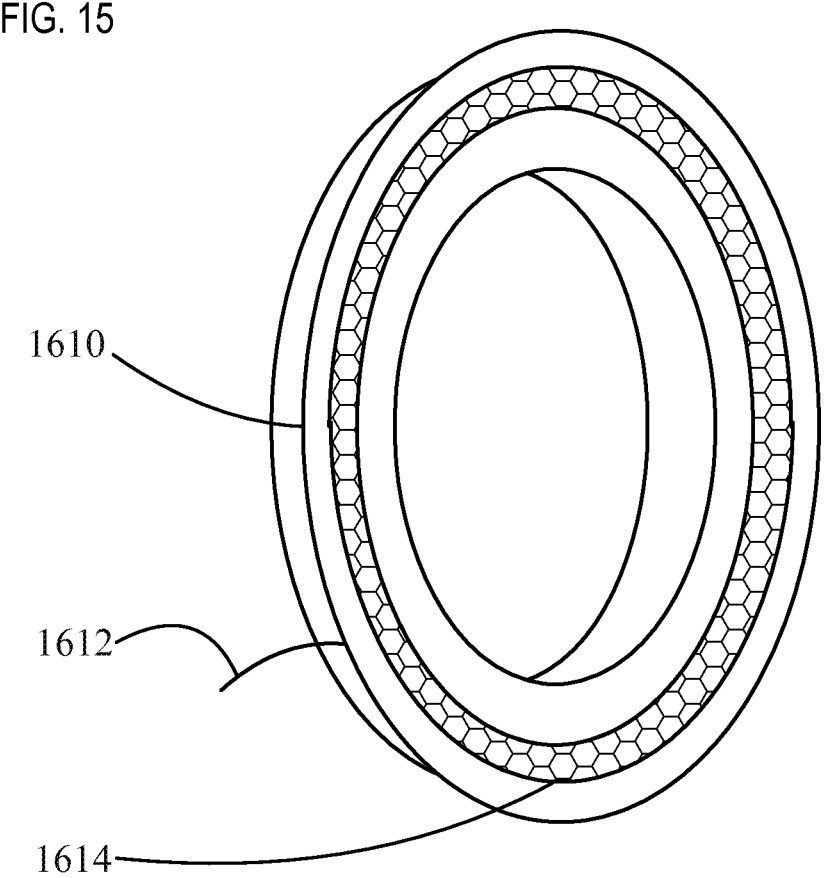

VEHICLE SAFETY WHEEL

CROSS-REFERENCE TO RELATED APPLICATION

The present application is a continuation-in-part of U.S. provisional patent application Ser. No. 61/810,201, filed Apr. 9, 2013, entitled "Vehicle Safety Wheel," and invented by William Tyson O'Neal.

TECHNICAL FIELD OF THE INVENTION

The present invention relates in general to automotive vehicle wheels, and in particular to a vehicle safety wheel for a vintage vehicle that allows use of modern tires and brakes.

BACKGROUND OF THE INVENTION

Over the last 50 years wheels (Rims) have gone through a huge change. The sidewall height to section width is called the aspect ratio. From approximately the 1950's-1970's tires and their associated rims were designed to be high aspect ratio. The wheels typically used were within the range of about 14-16 inches in diameter. Due to the small diameter of the rim, the tires themselves had longer sidewalls. These small rims resulted in smaller disc brakes and the resulting long sidewalls resulted in a large amount of sideward movement in the tire itself. Over time the size of wheels grew by over 25%. This increase in wheel size allowed the use of larger disc brakes and decreased the aspect ratio of the tires resulting in less sideward movement. Wheels themselves may last for many decades, while tires degrade quite quickly in comparison. Major tire manufacturers have by and large focused on tires for newer, higher volume cars being manufactured. The manufacture of older style tires for older style wheels has diminished due to reduced demand.

Many vintage cars originally used tires and wheels in sizes not readily available in today's market. Advances in tire technology have led to low-profile tires using ever larger diameter wheels. Thus, vintage car enthusiasts are faced with a choice between original equipment wheels and tires, or modern wheels and tires. The original equipment wheels and tires, and their copies, provide the correct vintage appearance, but do not offer the superior performance of modern wheel and tire technology. For example, the reduced weight, run-flat technology, and high-speed "R" compound rubber available in modern tires are generally available in sizes requiring large wheel sizes and/or low-profile tire configurations. Such modern wheel and tire combinations do not offer the vintage look.

The aftermarket manufactures have adapted various solutions one of which allows low aspect ratio wheel and tire combinations to be mounted to vintage cars that originally had high aspect ratio wheel and tire combinations. This success however is limited by the non-original look of the wheel tire combinations for vintage cars. This changeover to a low aspect ratio wheel and tire combination changes the original outward appearance of the car. The car sits lower and the tire/wheel combination does not fit the wheel well of the vintage car.

In the niche market of vintage racing many of the vintage racing tires are being manufactured for these vintage cars. Racing tires are illegal to run on the street because they are not safe for street driving. The sidewalls are typically very thin, so debris, and curbs may puncture them very easily. Also, the tire manufactures for the street market are not willing to build the high aspect ratio tire sizes for vintage street cars due to lack of a large market.

The vintage street cars of today are known as, resto-mods, pro-touring cars, muscle cars. Some of these cars have been "Hot Rodded" and have the potential of running speeds in excess of 200 mph, and have horsepower ratings exceeding 1000 hp. These are speeds and power levels that the vintage tire technology were not capable of safely handling.

What is needed is a vehicle wheel that allows older cars to preserve the appearance of their original look, while utilizing the higher performance braking disc, and the much improved safer tires that may be purchased at any location around the country. By accomplishing these two tasks, a safer wheel may be manufactured.

SUMMARY OF THE INVENTION

A vehicle safety wheel is disclosed having a central disk and a rim concentrically disposed around the central disk. The central disk is compatible with wheel mounting hardware, for registering with a vintage wheel hub and securing to the vintage wheel hub with the wheel mounting hardware. The rim has an inboard flange and an outboard flange for mounting a tire to the rim. An inner flange is provided which is disposed inwardly of and concentric with the outboard flange, such that an annular-shaped space is defined between the outboard flange and the inner flange. A fascia is provided which is adapted for fitting within the annular-shaped space for mounting between the outboard flange and the inner flange, with the fascia forming a visually continuous surface with a sidewall of the tire. The fascia may be embedded with a light source which is controlled in brightness and flashing by one of an accelerometer, a gyroscope, a brake sensor, and a turn sensor.

The vehicle safety wheel a new type of wheel, not just a larger wheel. Vehicle safety wheel meet the demands for vintage automobiles, both visually and from a performance and safety standpoint. In one embodiment a vehicle safety wheel may be provided with wider wheel flanges for holding wider tires than were previously utilized on vintage cars. In another embodiment the fascia on the outside of the flanges for vehicle safety wheels may be decorated to become a visual part of the car's overall design. The fascia may be coated or painted to look like part of the tire, whether it is a black wall, white wall, striped or lettered tires, and give the illusion that the person is driving a car with tires that no longer exist. The fascia may also have several degrees of negative draft to simulate a tire bulge. A sidewall design may be cut by machine into the fascia representing a sidewall, and the sidewall design may be selected by a customer to correspond to the tire the customer is running on the vintage car. Vehicle safety wheels may also be provided by one piece or multi piece wheels.

The vehicle safety wheel addresses problems of size compatibility of vintage cars, wheels and modern tires by providing a wheel capable of accepting modern tire formats while providing vintage appearance and compatibility with vintage wheel mounting technology. An example of the present disclosure provides wheels having a center portion with the appearance of a vintage wheel. The center portion is generally within the range of about 14-16 inches diameter and includes vintage design elements and a central wheel mounting pattern designed to be compatible with 5×4.75, 5×5, 4-lug, or spinner mounting hardware and the like.

Integral with the center portion of the wheel, a sidewall portion extends outward from the center portion to a diameter within the range of about 16-22 inches. On the exterior side of the wheel, the sidewall portion is preferably adapted to present the appearance of a selected vintage tire. Preferably, the wheel is fabricated of suitable metal as one integrated structure. It is envisioned that the wheel could comprise multiple piece constructions, billet one piece, two piece with cast center and a spun aluminum dish, a two piece with a billet center and spun aluminum dish, and the like.

Alternatively, the wheel may include a center portion and a sidewall portion manufactured separately, and subsequently affixed one to the other. Another alternative is to provide a removable sidewall fascia on the exterior side of the wheel. The removable sidewall fascia may be used to provide cosmetic alternatives such as whitewall, blackwall, raised lettering, and the like. Many variations are possible for example, the sidewall portion may be anodized metal, painted metal, plastic, painted plastic, sprayed on coating, powder coating and coated with rubber or material to simulate rubber, and may present various contours to simulate vintage tire sidewall shapes.

A tire may be mounted to the 16-22 inch wheel, the wheel may be mounted to a vintage format mounting fixture, and the wheel and tire combination may present the appearance of a vintage tire and wheel combination. Current common tire widths are 275 mm to 375 mm, and the disclosed wheel is envisioned to function with tire widths which are either larger or smaller than these current common tire widths. Current aspect ratios are 35 to 50, and the disclosed wheel is envisioned to function with tire aspect ratios which are either larger or smaller than these current common tire aspect ratios.

The features and other details of the disclosure will now be more particularly described with reference to the accompanying drawings, in which various illustrative examples of the disclosed subject matter are shown and/or described. It will be understood that particular examples described herein are shown by way of illustration and not as limitations of the disclosure. The disclosed subject matter should not be construed a limited to any of examples set forth herein. These examples are provided so that this disclosure will be thorough and complete, and will fully convey the scope of the disclosed subject matter to those skilled in the art. The principle features of this disclosure can be employed in various examples while remaining within the scope of the disclosure.

The terminology used herein is for the purpose of describing particular examples and is not intended to be limiting of the disclosed subject matter. Like number refer to like elements throughout. As used herein the term "and/or" includes any combination of one or more of the associated listed items. Also, as used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, elements, and/or components, but do not preclude the presence or addition of one or more other features, integers, steps, operations, elements, components, and/or groups thereof. Also, as used herein, relational terms such as first and second, top and bottom, left and right, and the like may be used solely to distinguish one entity or action from another entity or action without necessarily requiring or implying any actual such relationship or order between such entities or actions.

DESCRIPTION OF THE DRAWINGS

For a more complete understanding of the present invention and the advantages thereof, reference is now made to the following description taken in conjunction with the accompanying Drawings in which FIGS. 1 through 16 show various aspects for a vehicle safety wheel made according to the present invention, as set forth below:

FIG. 1 shows an exploded example of a vehicle safety wheel;

FIG. 2 shows an example of a vehicle safety wheel;

FIG. 3 shows an example of a vehicle safety wheel;

FIG. 4 shows an example of a three piece vehicle safety wheel with removable fascia in cross section;

FIG. 5 shows an example of a two piece vehicle safety wheel with removable fascia in cross section;

FIG. 6 shows an example of a one piece vehicle safety wheel with removable fascia in cross section;

FIG. 7 shows an example a vehicle safety wheel with removable fascia in cross section, held in place by a mechanical fastener;

FIG. 8 shows an example of removable fascia that utilizes mechanical fastening;

FIG. 9 shows an example of removable fascia that utilizes snap fastening;

FIG. 10 shows an example of removable fascia with illumination;

FIG. 11 shows an example of removable fascia with illumination having a power connection FIG. 12 shows an example of removable fascia with illumination;

FIG. 13 shows an example of removable fascia with illumination having a sensor

FIG. 14 shows an example of removable fascia with illumination having a generator;

FIG. 15 shows an example of removable fascia with illumination in strip form.

References in the detailed description correspond to like references in the various drawings unless otherwise noted. Descriptive and directional terms used in the written description such as right, left, back, top, bottom, upper, side, et cetera, refer to the drawings themselves as laid out on the paper and not to physical limitations of the disclosure unless specifically noted. The drawings are not to scale, and some features of examples shown and discussed are simplified or amplified for illustrating principles and features as well as advantages of the disclosure.

DETAILED DESCRIPTION OF THE INVENTION

A vehicle safety wheel is disclosed which is capable of utilizing modern aspect ratio tires while giving the original appearance of vintage aspect ratio tires. What is typically sold on the market mounts a 15 inch tire to a 15 inch wheel. One solution from the present disclosure adapts older, high aspect ratio technology wheel and tire combinations to newer, low aspect ratio technology wheel and tire combinations, while retaining the appearance of the original. Examples of the disclosure provide the illusion of running a vintage sized tire while taking advantage of the newer and safer available tires and disc brakes on the market.

Figure 1:
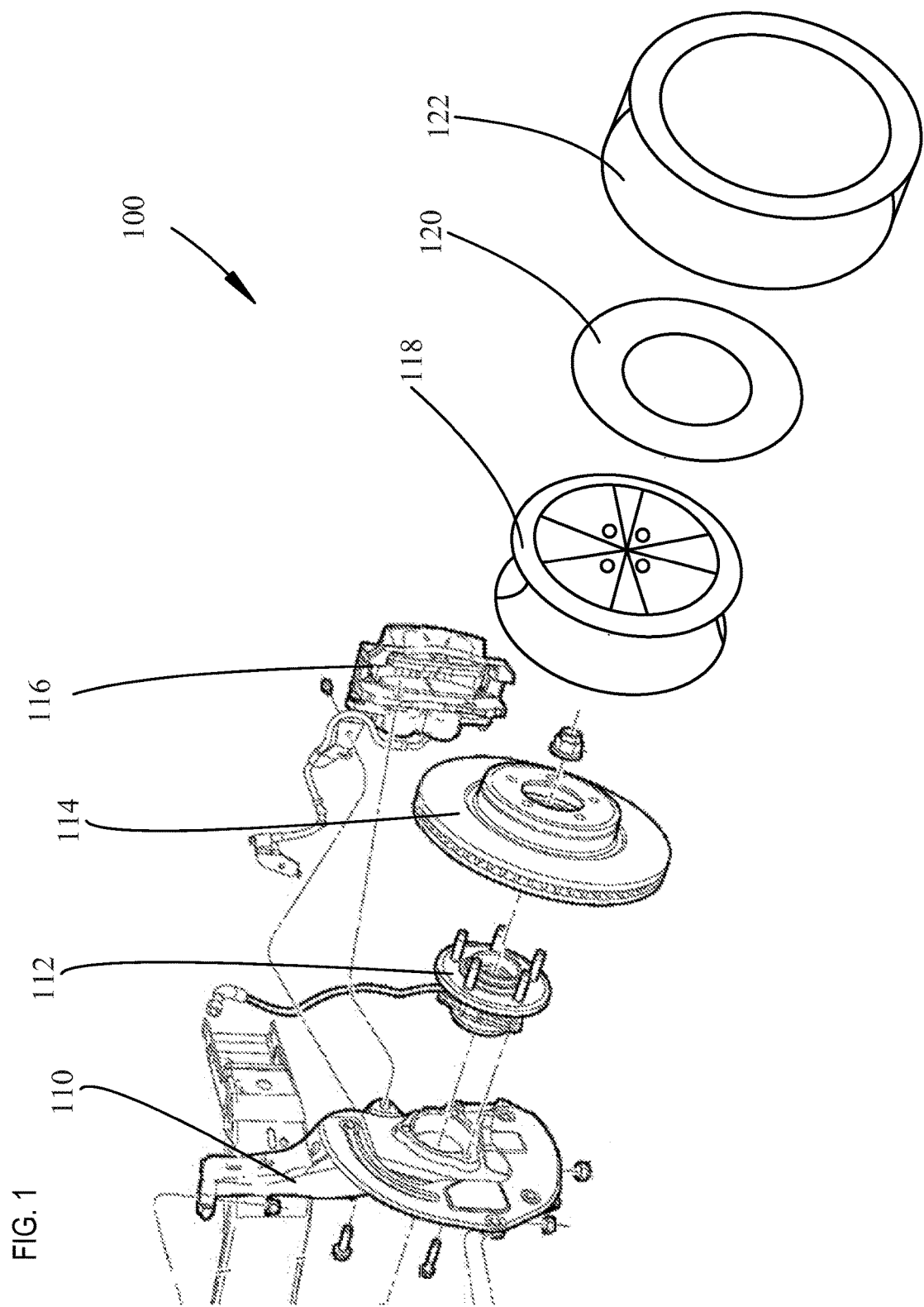

FIG. 1 depicts an example of an exploded vehicle safety wheel 100 mounted in a vehicle. The exploded view comprises an upright or spindle 110, a wheel hub 112, a disc brake 114 and a brake caliper 116. The safety wheel 100 comprises a tire 122 mounted on a wheel 118 having fascia 120.

Figure 2:
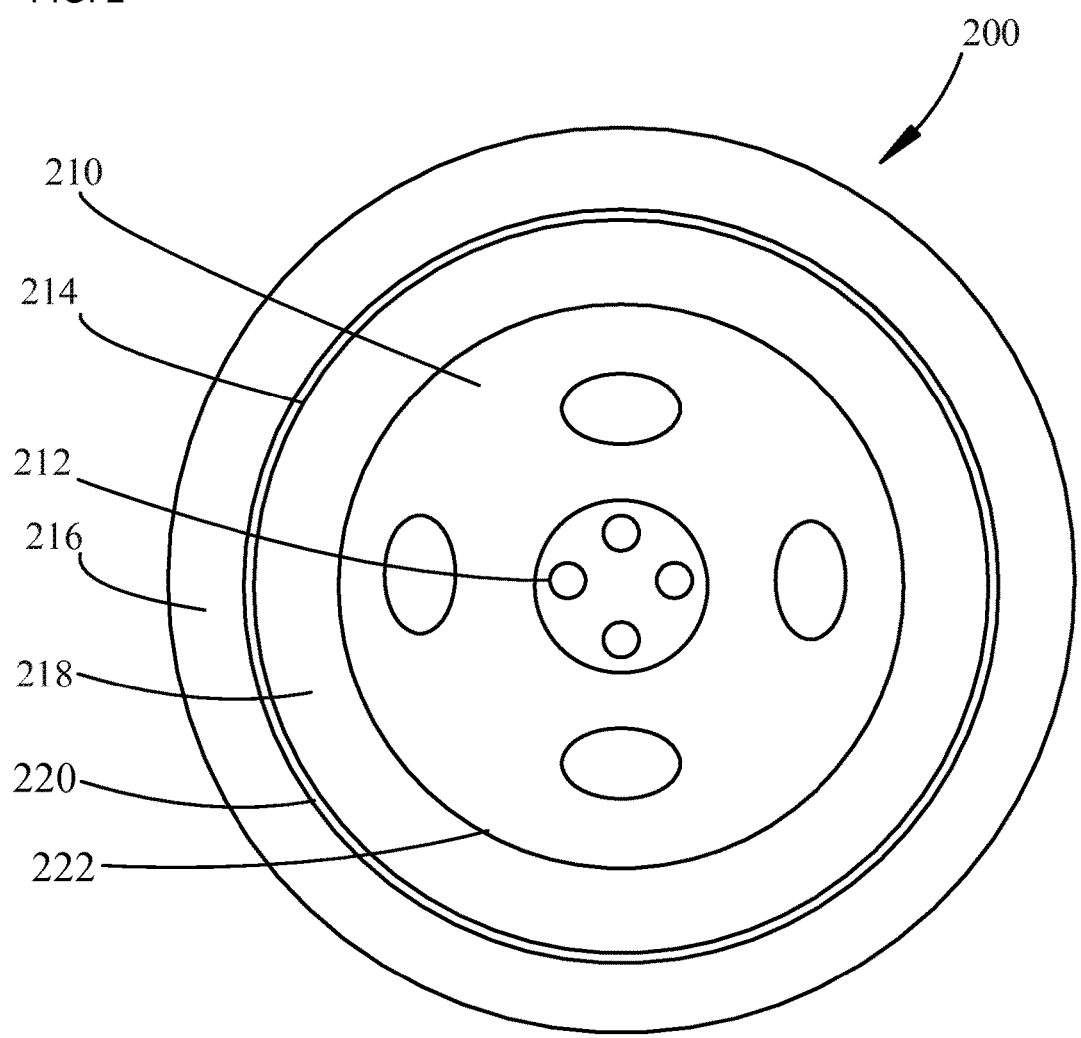

FIG. 2 shows an example of a vehicle safety wheel 200 comprising a central disk 210 compatible with wheel mounting hardware 212, a rim 214, also referred to as a hoop, connected to the central disk and capable of accepting a tire 216, and a fascia 218 connected to the rim 214. The fascia 218 is preferably mounted between an inward surface of an outer flange 220 defined by an outward edge of the rim 214 and an outward surface defined by an inward flange 222 provided by the rim 214. The fascia 218 preferably forms a visually continuous surface to the 216 tire. The fascia 218 may be affixed or removably affixed to the rim 214. The fascia 218 may be comprised of at least one of rubber, anodized metal, painted metal, plastic, painted plastic, powder coating and engineered metal and the like and may be at least one of colorable and engravable. The fascia 218 may also include an illumination source, as discussed below.

The rim 214 may be affixed to the central disk 210 by welds and/or by fasteners. The central disk 210 may be comprised of at least one of alloy, steel, aluminum, titanium, magnesium and composite matrix. The central disk 210 may be comprised a composite of fiber held together with a chemical binder to form a matrix, where the fiber is at least one of a carbon fiber, fiberglass fiber and a ceramic fiber. The central disk 210 may be formed by at least one of machining, vacuum-forming, autoclaving and casting. Additionally the wheel may be formed utilizing heating or cooling to accomplish the assembly or curing of the wheel. The vehicle safety wheel 200 may have central disk 210, the rim 214, the outward flange, the inward flange 222, and other such portions, defined by at least one of a one piece wheel, a two piece wheel, a three piece wheel and the like. The mounting hardware 212 may be comprised of at least one or more lug nuts, such as used for a 5×4.75 set of mounting hardware, a 5×5 set of mounting hardware, a 4-lug set of mounting hardware, or a spinner mount, and the like. The vehicle wheel 200 may have a predefined backspace offset defined by a user. The safety wheel 200 may allow mounting of tires 216 comprising an aspect ratio within a range of less than fifty on vehicles having original aspect ratios higher than fifty.

Figure 3:
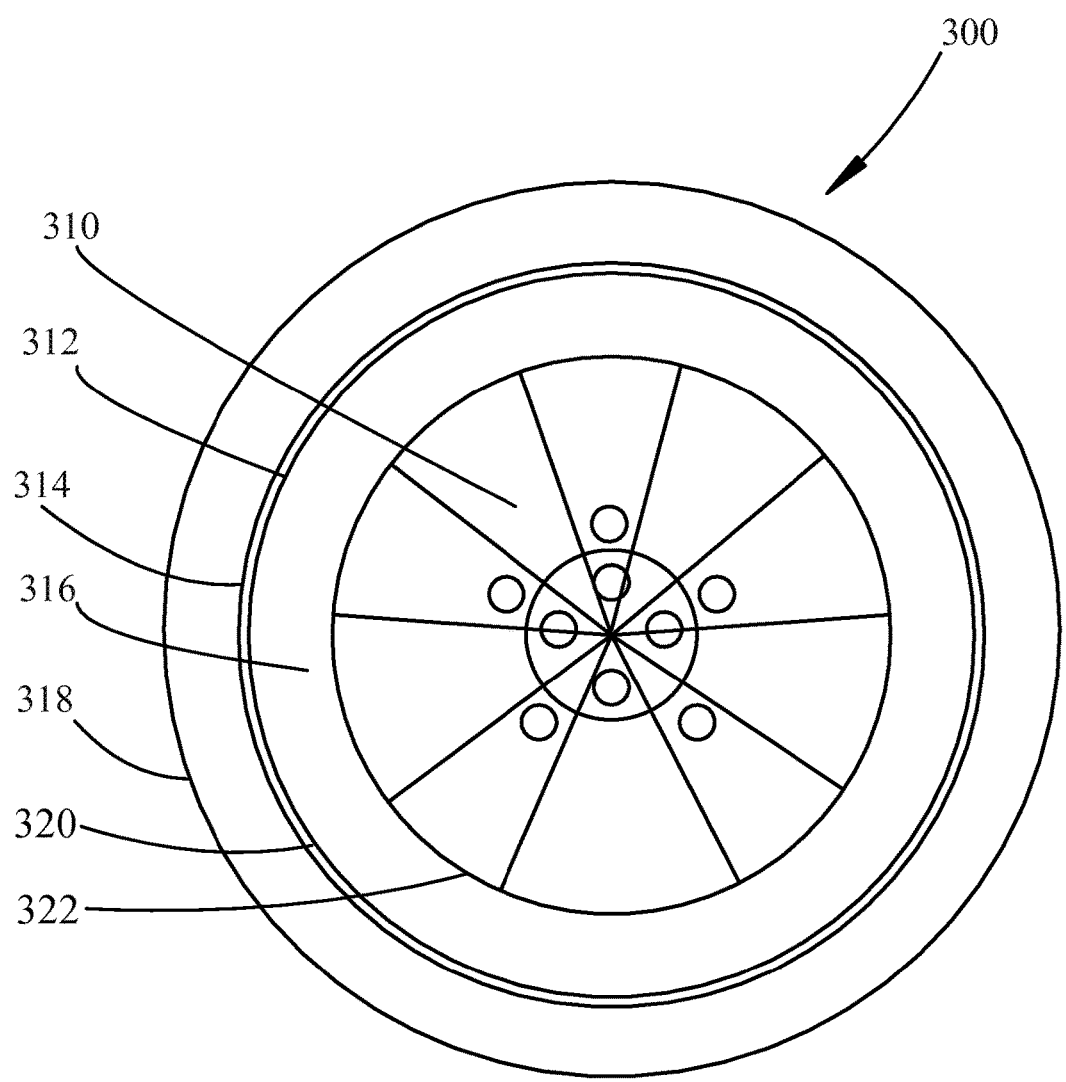

FIG. 3 shows an example of a vehicle safety wheel 300. The wheel 300 has an outboard surface, a central disk 310, and a rim 312 circumscribing the central disk 310. The rim 312 has a flange 320 circumscribing the rim 312. The flange 320 terminates in a flange lip 314. A sidewall 316 has an outer surface thereon. The sidewall is connected to the rim 312 and has a radially outermost edge aligned within a predetermined margin of the flange lip 314, so as to give a visible impression that the outer surface of the sidewall is actually an outer portion of a tire 318 and not a separately attached component of the vehicle safety wheel 300. The sidewall may be comprised of at least one of rubber, anodized metal, painted metal, plastic, painted plastic and the like. The vehicle safety wheel 300 may further comprise at least one of a quantity of 5×4.75 in. set of mounting hardware, a quantity of 5×5 in. set of mounting hardware, a 4-lug set of mounting hardware, a spinner mount and the like.

Figure 4:
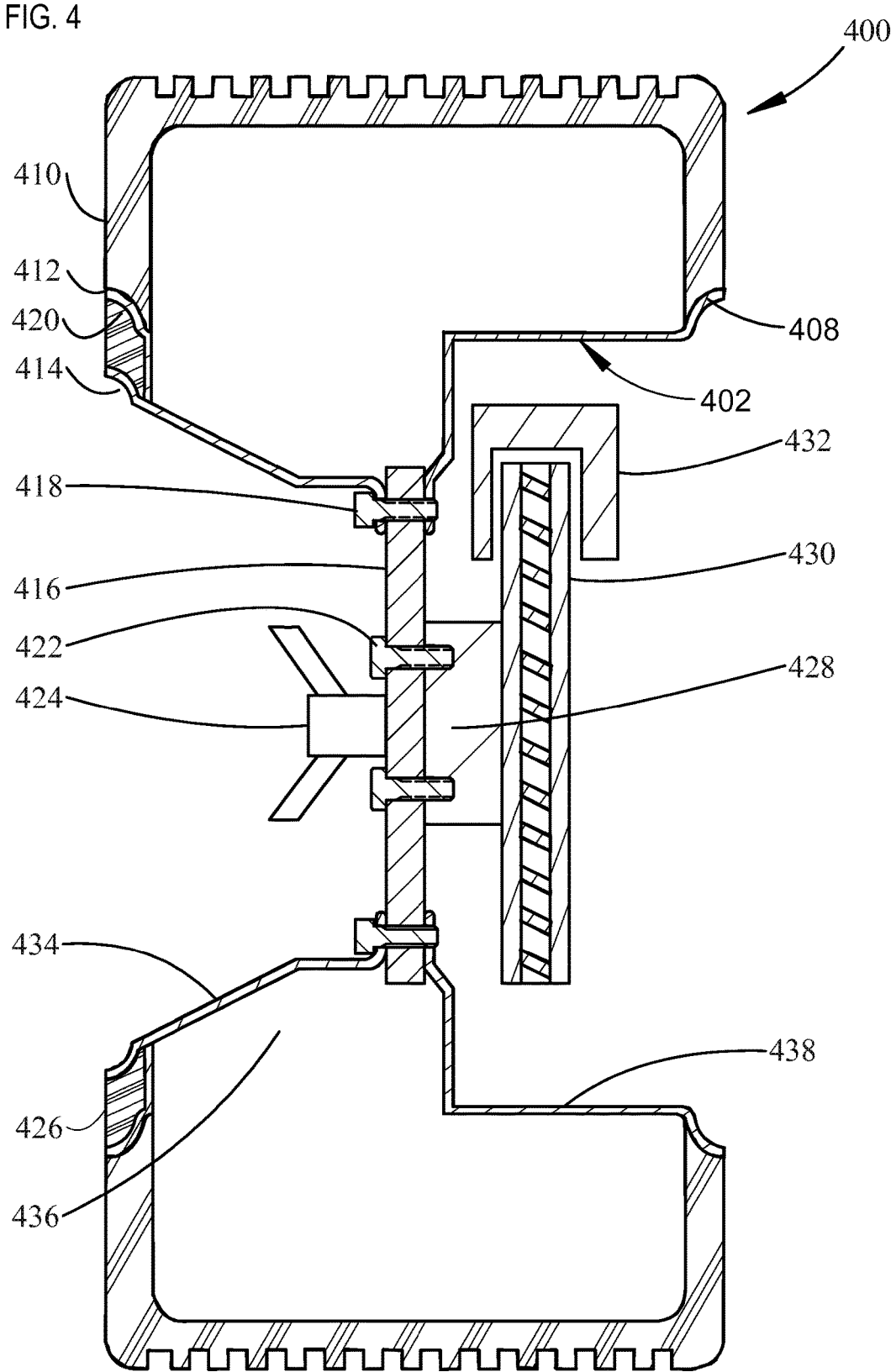

FIG. 4 shows an example of a three piece vehicle safety wheel 400 with a tire 410 mounted to the wheel 400. The wheel 400 has as rim 402 mounted to a center disk 416. The rim 402 has an inboard flange 408, an outboard flange 412, and an inner flange 414. The flanges 408 and 412 provide bead seats for seating the tire 410 on the rim 402 of the wheel 400. The inner flange 412 is spaced apart from the outboard flange 412, and disposed radially inward from the outboard flange 412 relative to the circumference of the rim 402 to create an annular-shaped space 420. Preferably a fascia 426 is a mating annular-shaped member for fitting in the space 420 to provide the appearance of a taller sidewall for the tire 410 mounted to the wheel 400, providing the impression of a vintage tire while using modern tires having smaller sidewalls than vintage tires. The fascia 426 may be colored with different materials to imitate tire colors and styles. Thus, the inner flange 414 in combination with the fascia 426 provides a faux tire flange with the appearance of a false or faux bead line so that the wheel 410 has the appearance of a vintage wheel, such as an eighteen inch diameter wheel. The center disk 416 is preferably used for two piece and three piece wheels, with the front and rear portions of the rim 402 which define the inboard flange 408, the outboard flange 412 and the inner faux flange 414 connected to the center disk 416. Connection bolts 418 are used with the three piece and two piece wheels to connect the different portions of the rim 402 to the center disk 416. Lug nuts 422 are used fasten center disk 416 to an axle hub. the wheel. A spinner 424 is also attached to the center disk 416 of the wheel 400. The spinner 424 may be a two or three point and may be faux with bolt on wheels. The spinner 424 may be used for retention when the knock off wheels and hubs are utilized. The disc brake hat 428 is connected to the center disk 416, the disc brake rotor 430 is connected to the disc brake hat 428, and the brake calipers 432 are spaced adjacent to the disc brake rotor 430. An inside of the wheel area 436 is shown as well as the back side of the wheel 438. The back side of the wheel 348 is recesses to allows space for receiving modern caliper brakes while retaining the visual appearance of a vintage fourteen inch, fifteen inch, and sixteen inch wheels, and the like.

Figure 5:
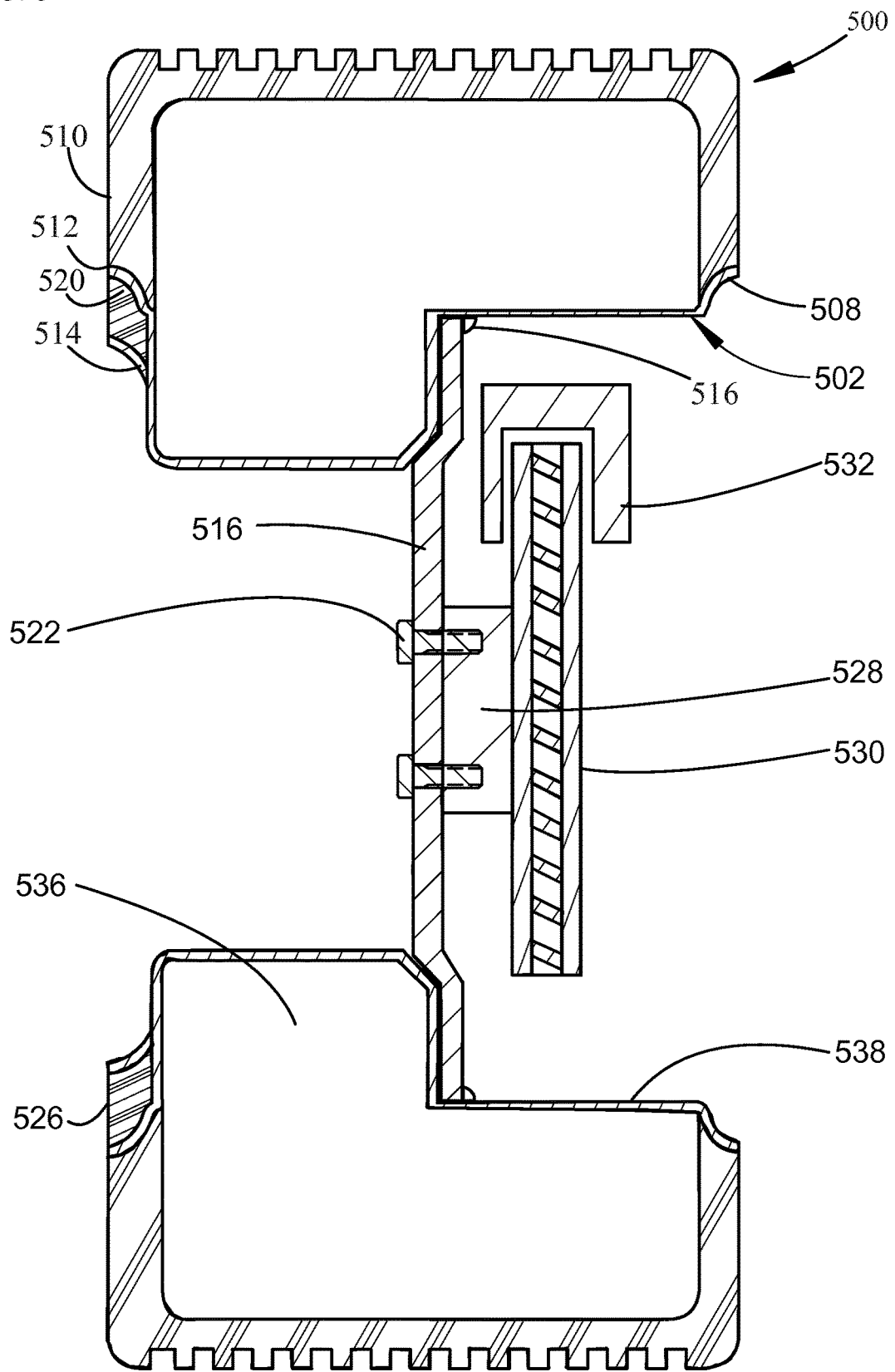

FIG. 5 shows an example of a two piece vehicle safety wheel 500 with a tire 510 mounted to the wheel 400. The wheel 500 has as rim 502 mounted to a center disk 516. The rim 502 has an inboard flange 508, an outboard flange 512, and an inner flange 514. The flanges 508 and 512 provide bead seats for seating the tire 510 on the rim 502 of the wheel 500. The inner flange 512 is spaced apart from the outboard flange 512, and disposed radially inward from the outboard flange 512 relative to the circumference of the rim 502 to create an annular-shaped space 520. Preferably a fascia 526 is a mating annular-shaped member for fitting in the space 520 to provide the appearance of a taller sidewall for the tire 510 mounted to the wheel 500, providing the impression of a vintage tire while using modern tires having smaller sidewalls than vintage tires. The fascia 526 may be colored with different materials to imitate tire colors and styles. Thus, the inner flange 514 in combination with the fascia 526 provides a faux tire flange with the appearance of a false or faux bead line so that the wheel 510 has the appearance of a vintage wheel, such as an eighteen inch diameter wheel. Welds 518 are used to connect the rim 508 to the center disk 516. Lug nuts 522 secure the center disk 516 of the wheel 500 to an axle hub. The disc brake hat 528 is connected to the center disk 516. The disc brake rotor 530 is connected to the disc brake hat 528 and the brake calipers 532 are spaced adjacent to the disc brake rotor 530. An inside of the wheel area 536 is shown as well as the back side 538 of the wheel 500. The back side 538 of the rim 508 of the wheel 500 has a profile which provides space for receiving modern caliper brakes to be used while retaining the visual appearance of a vintage fourteen inch, fifteen inch, and sixteen inch wheels, and the like.

Figure 6:
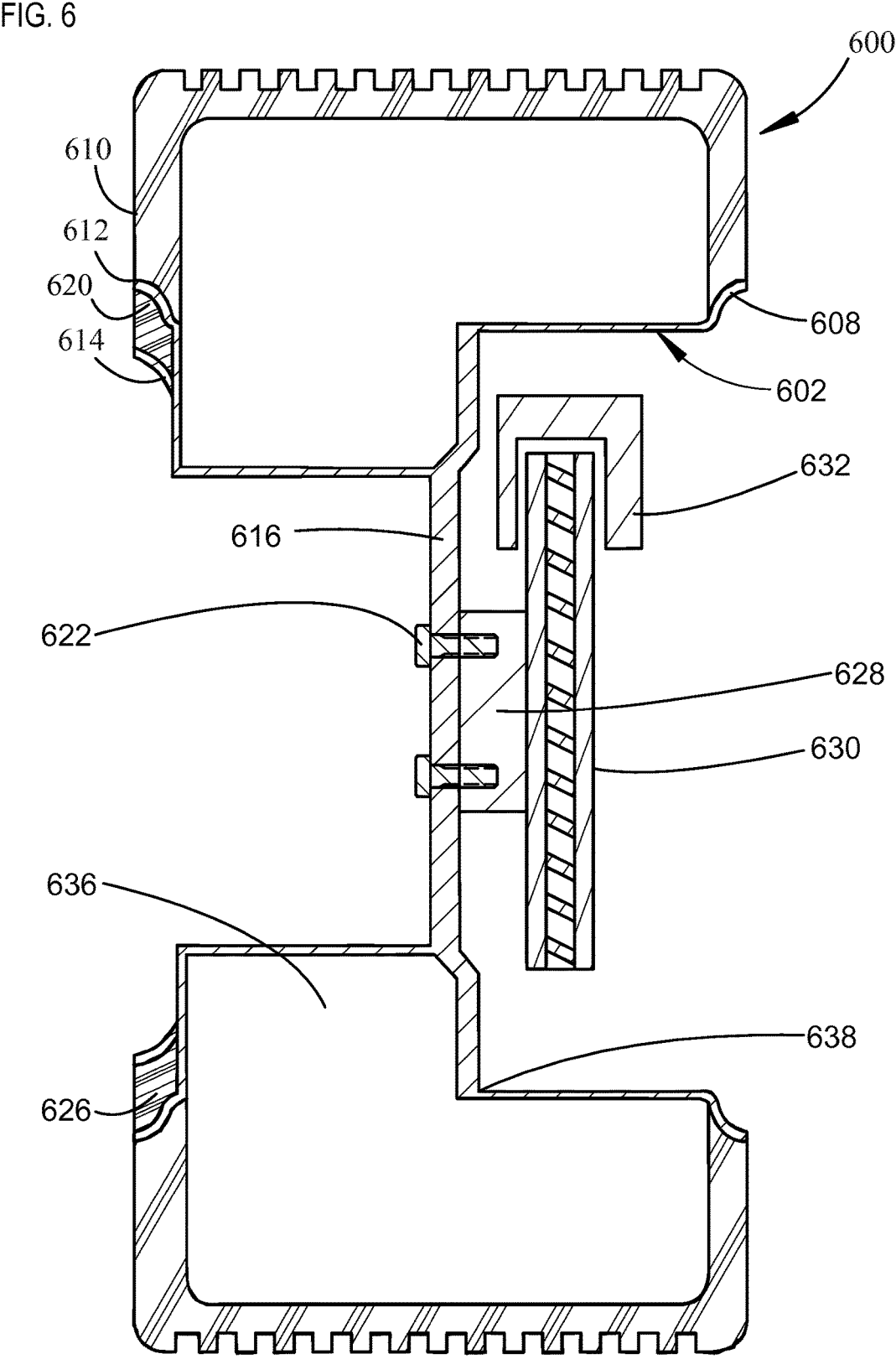

FIG. 6 shows an example of a one piece vehicle safety wheel 600. The wheel 600 has as rim 602 mounted to a center disk 616. The rim 602 has an inboard flange 608, an outboard flange 612, and an inner flange 614. The flanges 608 and 612 provide bead seats for mounting the tire 610 on the rim 602 of the wheel 600. The inner flange 612 is spaced apart from the outboard flange 612, and disposed radially inward from the outboard flange 612 relative to the circumference of the rim 602 to create an annular-shaped space 620. Preferably a fascia 626 is a mating annular-shaped member for fitting in the space 620 to provide the appearance of a taller sidewall for the tire 510 mounted to the wheel 600, providing the impression of a vintage tire while using modern tires having smaller sidewalls than vintage tires. The fascia 626 may be colored with different materials to imitate tire colors and styles. Thus, the inner flange 614 in combination with the fascia 626 provides a faux tire flange with the appearance of a false or faux bead line so that the wheel 610 has the appearance of a vintage wheel, such as an eighteen inch diameter wheel. The rim 608 to the center disk 616 are shown as being formed of one continuos metal member. Lug nuts 622 secure the center disk 616 of the wheel 600 to an axle hub. The disc brake hat 628 is connected to the center disk 616. The disc brake rotor 630 is connected to the disc brake hat 628 and the brake calipers 632 are spaced adjacent to the disc brake rotor 630. An inside of the wheel area 636 is shown as well as the back side 638 of the wheel 600. The back side 638 of the rim 608 of the wheel 600 has a profile which provides space for receiving modern caliper brakes to be used while retaining the visual appearance of a vintage fourteen inch, fifteen inch, and sixteen inch wheels, and the like.

Figure 7:
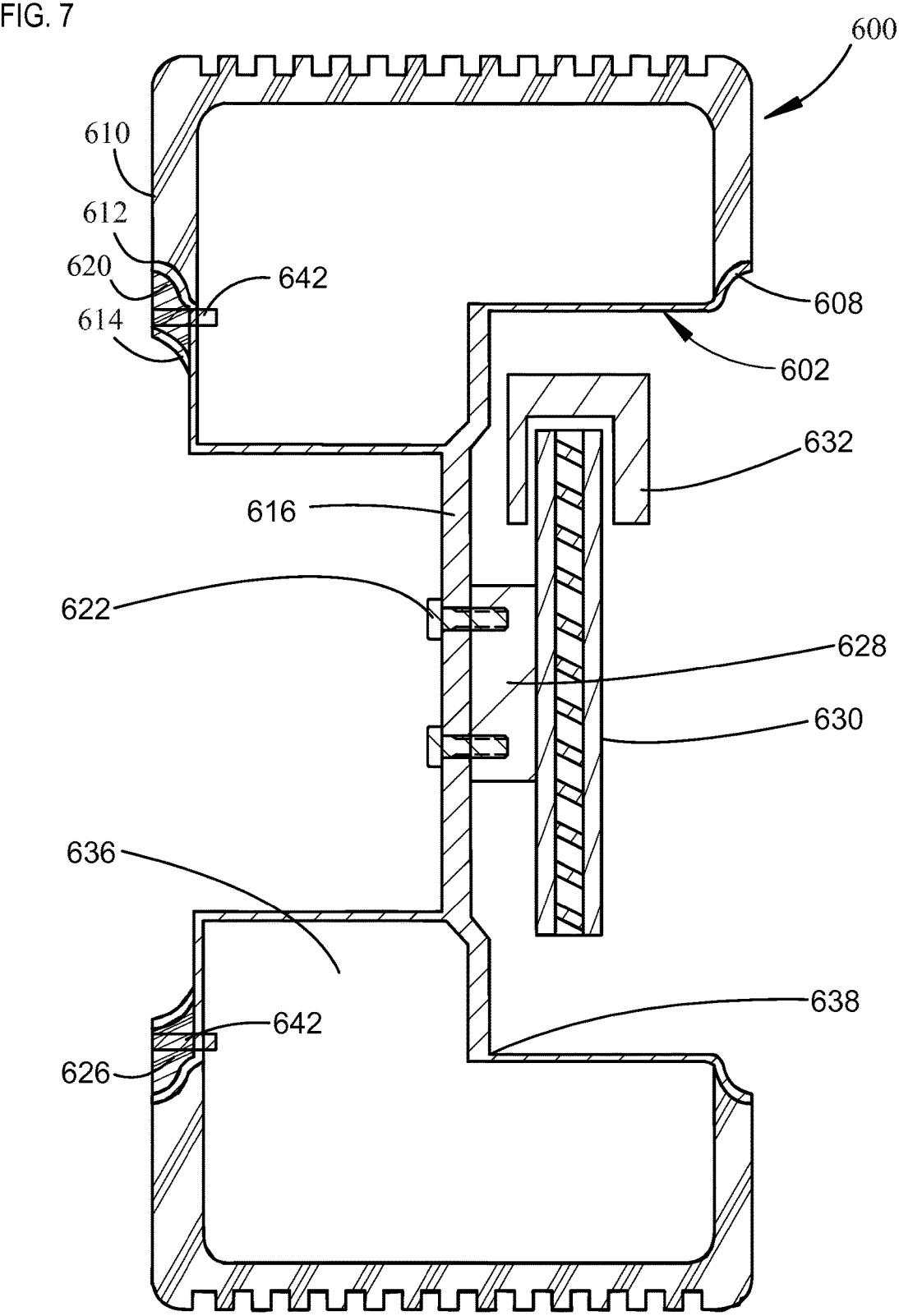

FIG. 7 shows the vehicle safety wheel 600 of FIG. 6, with removable fascia 626 in place by a mechanical fastener 642. The mechanical fastener 642 may be provide by rivets, bolt and nut(s), clinch nut, screw and the like.

Figure 8:
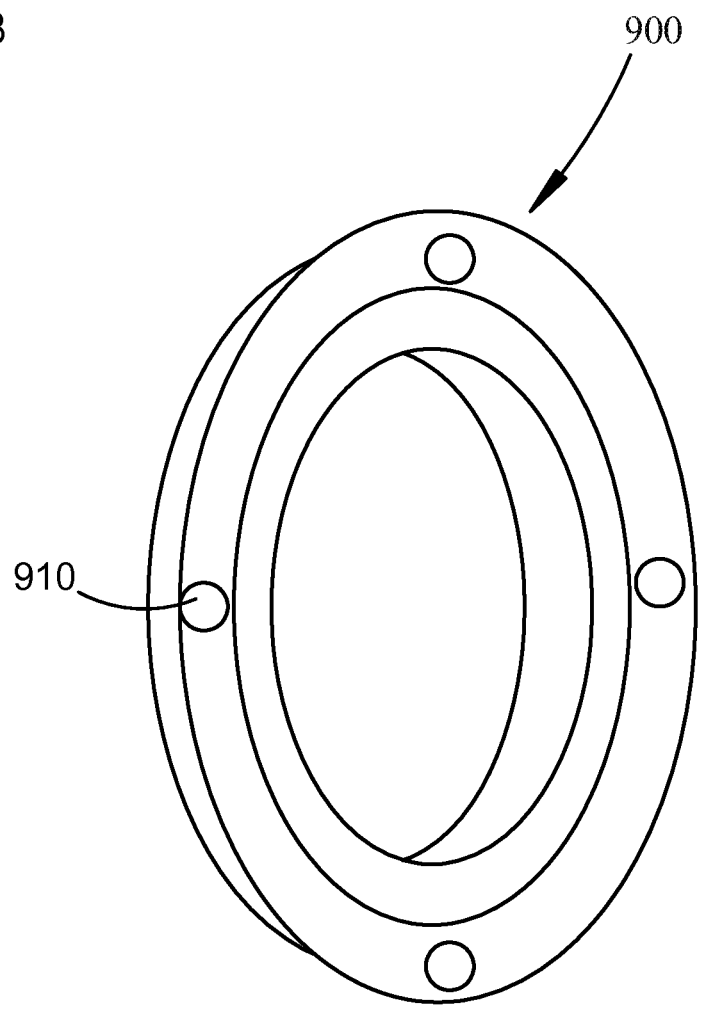

FIG. 8 depicts an example of the fascia 900 that may be removably affixed to the rim 814. The fascia may be removably connected in a number of ways. Mechanically fastening the fascia would entail threaded holes in the wheels (See FIG. 7) and holes 910 in the fascia 900 for receiving bolts for anchoring the fascia 900 to be anchored to a wheel. In addition, depending on the application or design, the fascia mechanical fastener may be in part lug nuts of the wheel.

Figure 9:
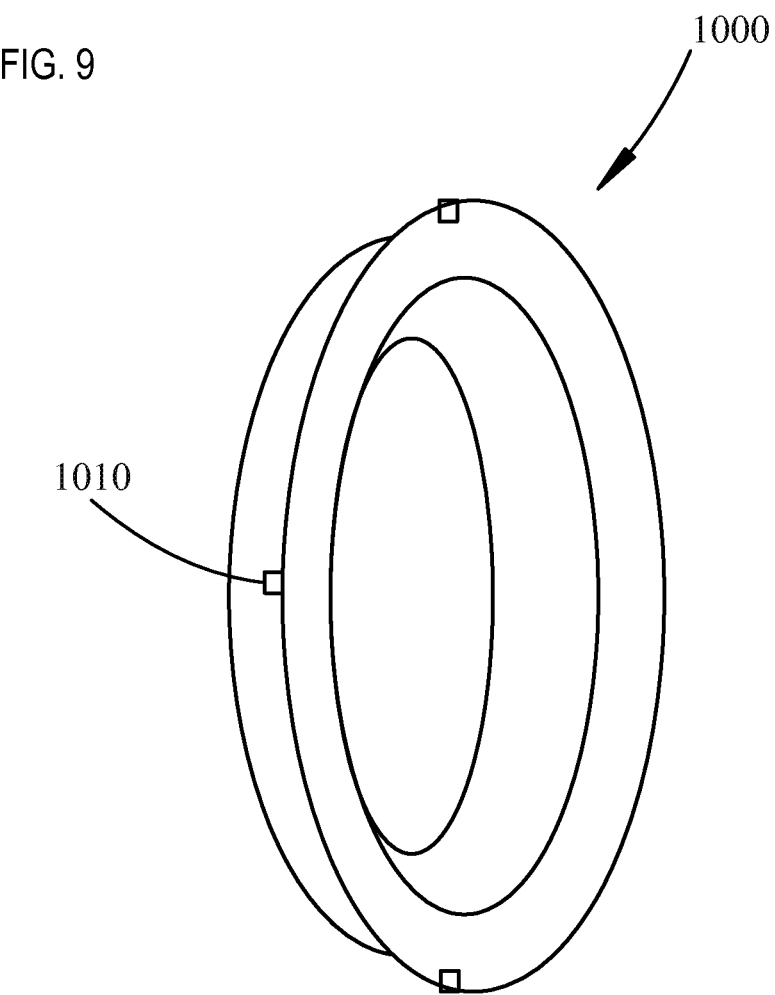

FIG. 9 depicts an example of the fascia 1000 that may utilize a snap connection 1010 to a rim. Snap fastening the fascia 1000 could utilize a false flange, and a snap fastened attachment similar to that used for the older hubcaps. One possible difference between these and old style hubcaps is the area which is available, to be effected or customized. This may allow a broader area to be used for a different visual impact.

Figure 10:
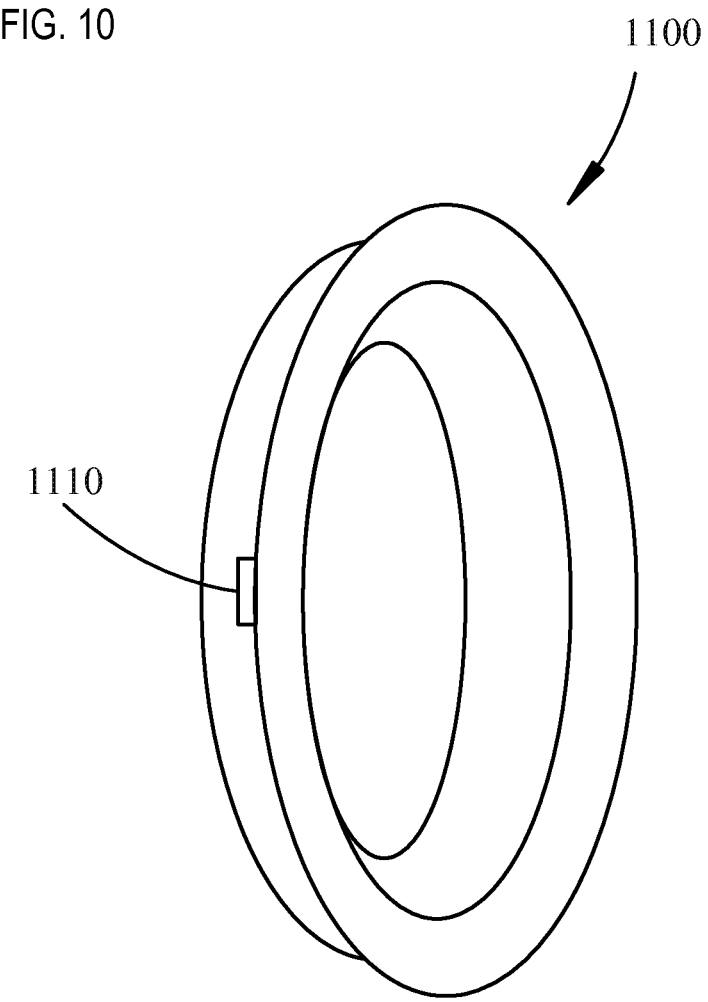

FIG. 10 depicts an example of the fascia 1100 that may utilize a magnetic connection 1110 to a rim. Magnetically fastening the fascia 1100 could be chosen to hold a magnetized fascia to a wheel by means of a magnetic fastener.

Also, chemically adhering the fascia could be accomplished by using a number of currently available water proof adhesives on the market and chemically bonding could be utilized in which a number of fascia could be sprayed onto the wheel directly thus not needing other types of fastening. This may be effective to add on a reflective portion or a glow in the dark system for those wishing to be seen as much as possible in low light circumstances. Depending on the additives of the spray, other such custom characteristics could be achieved involving colors, glitter, or custom reflective surfaces.

A combination of one or more fastening techniques be used to achieve a stronger attachment between the wheel and the fascia. Since CNC processes has become widely used, additional flanges, snap on attachment points, or mechanical fastening points could be directly machined into the wheel. This may provide a large variety of fastening options. The additional fascia could make use of the false bead line for attachment points. The inner side of the fascia, could give chemically bonded, and magnetically bonded fascia, solid anchoring to the wheel. In some decorative uses the fascia could come over onto the dish of the hoop for a more thorough covering of the wheel surface.

The safety wheel may provide features that may allow the use of modern tires for smaller wheels, the use of larger brakes on smaller wheels and allow users to add additional safety features to their car. The outer flange that holds the fascia may also be used to hold a reflective portion or luminary portion which may make it much easier to see at night for traffic coming from a perpendicular direction. This feature may be used on other types of wheels such as motorcycles, bicycles and the like, including wheels that would gain from having extra visibility.

The safety wheel may allow fascia to be placed around the perimeter of the wheel to look like the tire that is mounted to the wheel, appearing to be an older style tire. Cosmetic features may be added to the safety wheel such as adding color to the wheel to match a car or to give a personalized appearance.

Another possible use of the safety wheel would be to have the look of a sixteen (16) inch diameter wheel, while in reality the car is utilizing low profile twenty two (22) inch tires. This may create a three (3) inch area around the wheel for a user display canvass. It may allow the user a way to advertise themselves, a company, a cause or the like. Over the years this has been done by the tire companies by utilizing raised white lettering to advertise their company and types of tires. Thus, the safety wheel would allow the consumer the ability to advertise in the same way. Brand recognition using this feature may be a very easy and inexpensive way to advertise. With low profile tires that are available, the space that was once available to large manufacturers can now be made available to the owner and/or producer of the safety wheels.

Figure 11:
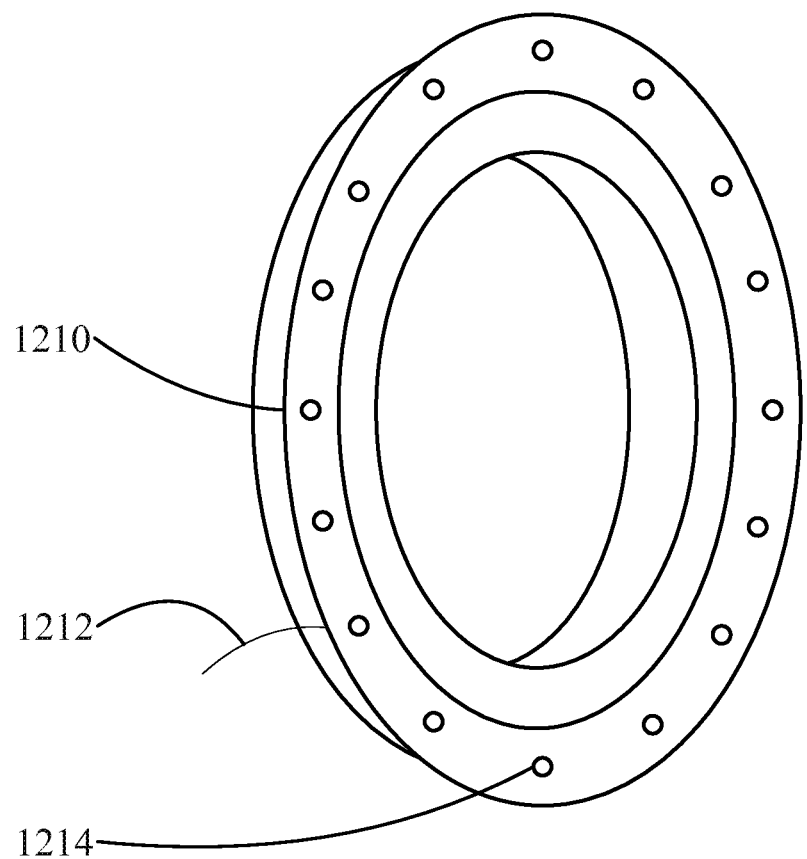

Another example shown in FIG. 11 of a fascia 1210 for use with a vehicle safety wheel, such as those noted hereinabove. The fascia 1210 being an illuminated fascia which connected to rim. The illuminated fascia 1210 has a power connection 1212 which electrically connects to a power supply mounted to or connected to a rim to which the fascia 1210 is mounted. Light emitting diodes 1214 are mounted to the fascia 1210 and are electrically connected to the power connection to power the light emitting diodes 1214. A sensor (not shown) may be electrically connected to the power connection and mounted to the fascia 1210, a wheel, or a vehicle. The sensor may be provided by an accelerometer, a gyroscope, a brake sensor, and a turn sensor, or combinations thereof. The safety wheel may also comprise a generator electrically connected to the power connection, wherein the generator is at least one of an electrostatic generator, a dynamo, an alternator, an induction generator and a homopolar generator and a power source electrically connected to the power connection.

Figure 12:
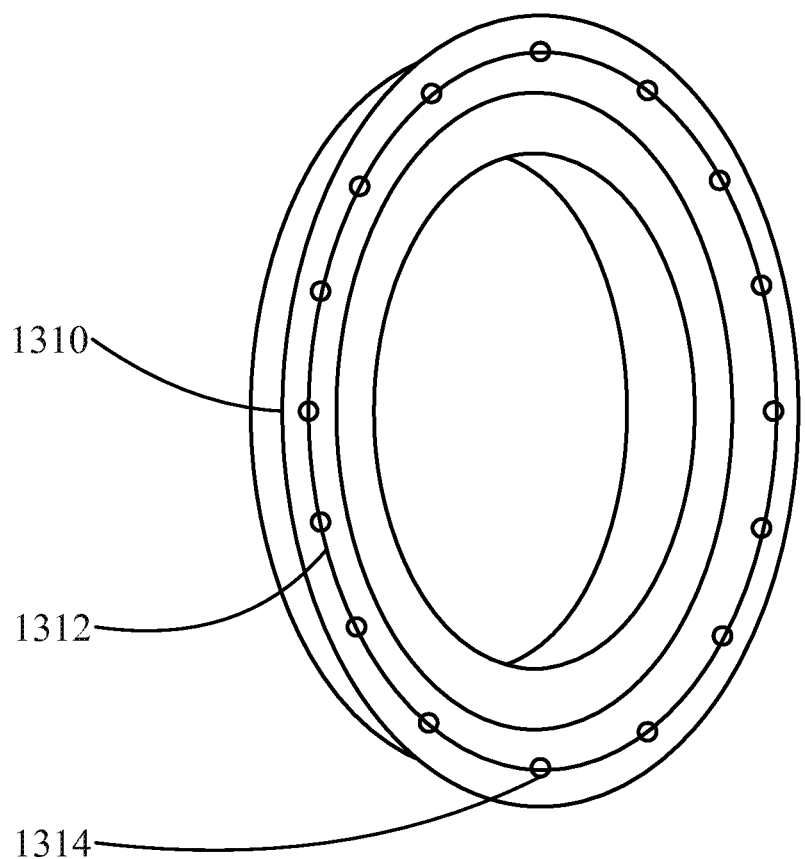

FIG. 12 shows a fascia 1310 for mounting to a vehicle safety wheel, such as those noted above. The fascia 1310 preferably includes one or more illumination sources 1314 optically connected to at least one light pipe 112 extending in or on the fascia for providing illumination. An illumination source may be at least one of incandescent, mercury vapor, light emitting diode, organic light emitting diode, florescent, metal halide, high pressure sodium and low pressure sodium. A power connection and a power supply may be provided which is electrically connected to the illumination source. The power supply may be provided by an electric generator.

Figure 13:
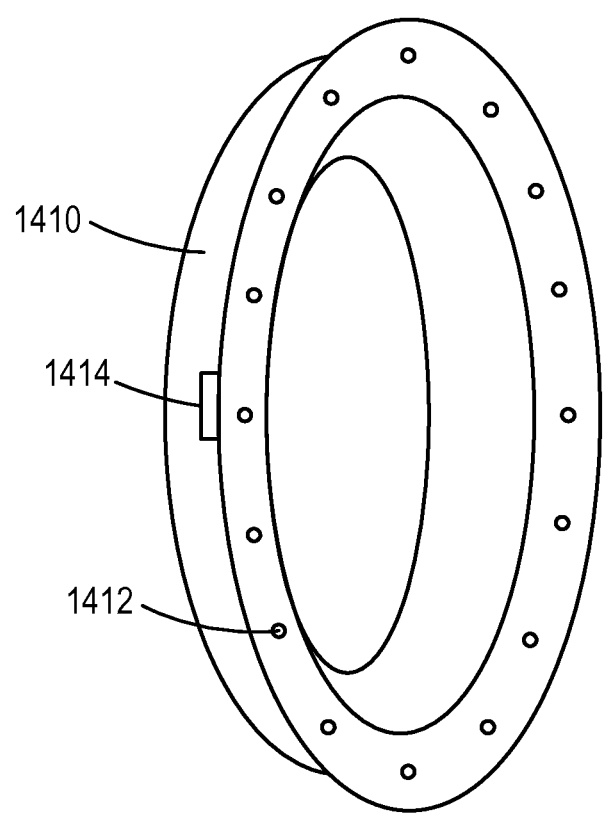

FIG. 13 shows a further example of a light pipe fascia 1410 for connecting to a rim of a vehicle safety wheel. The fascia 1410 rim has at least one illumination source 1412. One or more sensor 1414 (one shown) may be electrically connected to the at least one illumination source 1412. The sensor may comprise an accelerometer, gyroscope, a brake sensor and a turn signal sensor.

Figure 14:
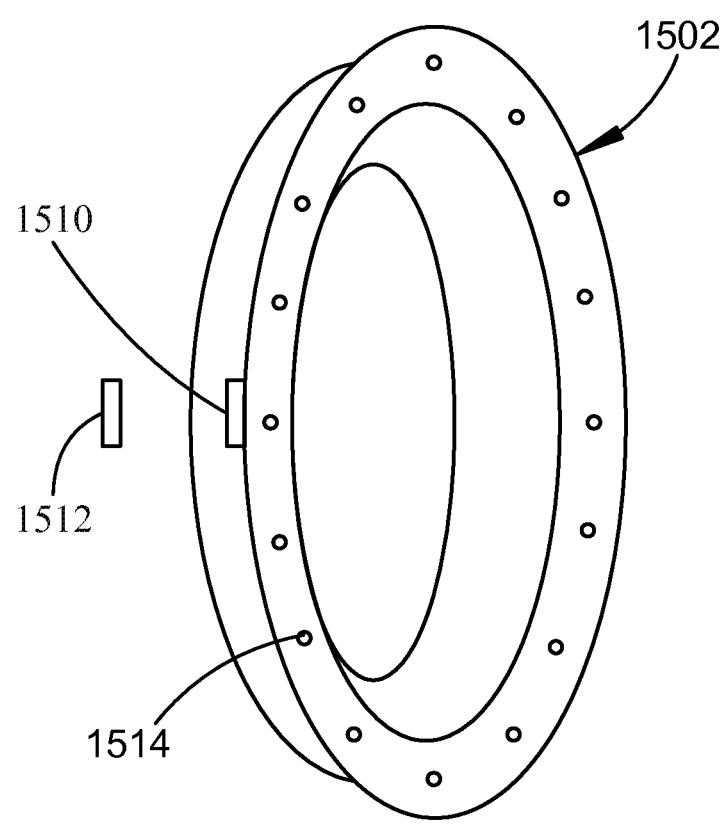

FIG. 14 shows a fascia 1502 which has a generator 1510, 1512 electrically connected to the illumination source 1514. The generator 1510, 1510 may be provided by at least one of an electrostatic generator, a dynamo, an alternator, an induction generator and a homopolar generator. The illumination source 1514 may be provided by one or more of an incandescent source, a mercury vapor source, a light emitting diode, an organic light emitting diode, a florescent source, a metal halide source, a high pressure sodium source and a low pressure sodium source. An illumination color of the sensor 1510, 1512 is based at least in part upon a signal from the sensor 1510, 1512, an illumination brightness of the sensor 1510, 1512 is based at least in part upon a signal from the sensor 1510, 1512, and a blink rate of the sensor 1510, 1512 is based at least in part upon a signal from the sensor 1510, 1512.

FIG. 15 shows an annular-shaped fascia 1610 which is mounted to a vehicle safety wheel as described above. The fascia 1610 has a power connection 1612 which is electrically connected to an illuminated annular-shaped ribbon 1614 mounted to an outboard surface of the fascia 1610. The annular-shaped ribbon 1614 may also be reflective to provide a reflective outer surface.

It is envisioned that illumination for the vehicle safety wheels will respond to deceleration or change in lane of the vehicle and either changes the color, the brightness or the blink rate of the illumination source. It is also envisioned that the vehicle safety wheel color, the brightness or the blink rate of the illumination source will change based upon either the turn signal sensor and/or the brake sensor. In this way the wheel will indicate the change in state of the velocity or change in lane in real time, or the intended change in state of velocity or change in lane based on the brake and turn lane sensors.

While the making and using of various exemplary examples of the disclosure are discussed herein, it is to be appreciated that the present disclosure provides concepts which can be described in a wide variety of specific contexts. For purposes of clarity, detailed descriptions of functions, components, and systems familiar to those skilled in the applicable arts are not included. The methods and apparatus of the disclosure provide one or more advantages including which are not limited to, providing a vintage appearance while using modern tires and safety enhancements by using newer tire technologies on vintage vehicles. While the disclosure has been described with reference to certain illustrative examples, those described herein are not intended to be construed in a limiting sense. For example, variations or combinations of steps or materials in the examples shown and described may be used in particular cases while not departing from the disclosure. Various modifications and combinations of the illustrative examples as well as other advantages and examples will be apparent to persons skilled in the arts upon reference to the drawings, description, and claims.

The present invention provides advantages of a solution to a current problem that did not exist when the original vintage wheels were being produced. Further, it allows the vintage car to attain a better ride with higher performance and safer tires and disc brakes. Additionally, these newer tires may be purchased for the car at any location around the country.

Although the preferred embodiment has been described in detail, it should be understood that various changes, substitutions and alterations can be made therein without departing from the spirit and scope of the invention as defined by the appended claims.

What is claimed is:

1. A vehicle safety wheel, comprising:
   a central disk compatible with wheel mounting hardware, for registering with a wheel hub and securing to the wheel to the hub with said wheel mounting hardware;
   a rim connected to said central disk, concentric with said central disk, said rim extending exteriorly around and circumscribing said central disk, and said rim having an inboard flange and an outboard flange for mounting a tire thereto;
   one of said rim and said central disk further including an inner flange disposed radially inward and spaced apart from said outboard flange, with said inner flange disposed concentric with said outboard flange to define an annular-shaped space; and wherein the inboard flange and outboard flange provide bead seats for seating a tire, and the inner flange is curved to match a profile of the outboard flange to provide a faux bead line
   a fascia adapted for being received in said annular-shaped space and securing between said outboard flange and said inner flange, wherein said fascia defines visually continuous surface disposed adjacent to a sidewall of the tire mounted to said rim, wherein said fascia comprises at least one of a reflective portion, a luminary portion, and an illumination source.

2. The vehicle safety wheel according to claim 1, wherein said fascia is removably affixed to said rim, wherein said removable affixment comprises at least one or more of mechanical fasteners, one snap fasteners, and magnetic fasteners.

3. The vehicle safety wheel according to claim 1, wherein said fascia is affixed to said rim by means of one of chemical adhesion and chemical bonding.

4. The vehicle safety wheel according to claim 1, wherein said fascia is comprised of at least one of rubber, anodized metal, painted metal, plastic, painted plastic, powder coating and engineered metal.

5. The vehicle safety wheel according to claim 1, wherein at least one of said central disk and said rim comprises at least one of alloy, steel, aluminum, titanium, magnesium and composite matrix.

6. The vehicle safety wheel according to claim 1, wherein said mounting hardware is comprised of at least one of at least one lug nut and a knock off spinner mount.

7. The vehicle safety wheel of claim 1, comprising:
   at least one illuminated fascia connected to said rim; and
   a power connection electrically connected to said at least one illuminated fascia.

8. The vehicle safety wheel of claim 1, wherein the fascia comprises an illumination source including at least one light emitting diode connected to said illuminated fascia.

9. The vehicle safety wheel of claim 1, further comprising at least one sensor electrically connected to said power connection, wherein said at least one sensor comprises at least one of an accelerometer, a gyroscope, a brake sensor, and a turn sensor.

10. The vehicle safety wheel of claim 9, further comprising at least one generator connected to said power connector, wherein said at least one generator is at least one of an electrostatic generator, a dynamo, an alternator, an induction generator and a homopolar generator.

11. The vehicle safety wheel of claim 8, wherein said fascia further comprises at least one light pipe fascia connected to said rim, wherein said at least one illumination source is optically connected to said at least one light pipe fascia, and
    wherein said at least one illumination source is at least one of incandescent, mercury vapor, light emitting diode, organic light emitting diode, florescent, metal halide, high pressure sodium and low pressure sodium.

12. A vehicle safety wheel, comprising:
a central disk compatible with wheel mounting hardware, for registering with a wheel hub and securing to the wheel to the hub with said wheel mounting hardware;
a rim connected to said central disk, concentric with said central disk, said rim extending exteriorly around and circumscribing said central disk, and said rim having an inboard flange and an outboard flange for mounting a tire thereto;
one of said rim and said central disk further including an inner flange disposed radially inward and spaced apart from said outboard flange, with said inner flange disposed concentric with said outboard flange to define an annular-shaped space; and wherein the inboard flange and outboard flange provide bead seats for seating a tire, and the inner flange is curved to match a profile of the outboard flange to provide a faux bead line
a fascia adapted for being received in said annular-shaped space and securing between said outboard flange and said inner flange, wherein said fascia defines visually continuous surface disposed adjacent to a sidewall of the tire mounted to said rim, and said visually continuous surface of said fascia defines a faux sidewall portion, said faux sidewall portion having a radially outermost edge aligned within a predetermined margin of a lip of said outboard flange, so as to give a visible impression that said visually continuous surface of said fascia defining said faux sidewall is a continuous portion of the sidewall of the tire and not a separately attached component of said vehicle safety wheel, wherein said fascia comprises at least one of a reflective portion, a luminary portion, and an illumination source.

13. The vehicle safety wheel according to claim 12, wherein said faux sidewall is comprised of at least one of rubber, anodized metal, painted metal, plastic, painted plastic, sprayed on coating and powder coating.

14. A vehicle safety wheel, comprising:
a central disk compatible with wheel mounting hardware, for registering with a wheel hub and securing to the wheel hub with said wheel mounting hardware;
a rim connected to said central disk, concentric with said central disk, said rim having an inboard flange and an outboard flange which are adapted for mounting a tire thereto;
one of said rim and said central disk further including an inner flange mounted radially inward from said outboard flange with said outboard flange concentric with and circumscribing said inner flange to define an annular-shaped space there-between; and wherein the inboard flange and outboard flange provide bead seats for seating a tire, and the inner flange is curved to match a profile of the outboard flange to provide a faux bead line
a fascia adapted for mounting within said annular-shaped space defined between said outboard flange and said inner flange, such that said fascia circumferentially extends between said outboard flange and said inner flange and defines a visually continuous surface to a sidewall of the tire mounted to said rim, wherein said fascia comprises at least one of a reflective portion, a luminary portion, and an illumination source.

15. The vehicle safety wheel of claim 14, further comprising:
at least one light pipe embedded in said fascia;
at least one illumination source optically connected to said at least one light pipe which is embedded in said fascia; and
at least one sensor electrically connected to said at least one illumination source.

16. The vehicle safety wheel of claim 15, wherein said at least one sensor comprises one more of an accelerometer, a gyroscope, a brake sensor and a turn signal sensor.

17. The vehicle safety wheel of claim 15, wherein said at least one illumination source is at least one of an incandescent source, a mercury vapor source, a light emitting diode, an organic light emitting diode, a florescent source, a metal halide source, a high pressure sodium source and a low pressure sodium source.

18. The vehicle safety wheel of claim 15, wherein at least one of an illumination color, an illumination brightness, and a blink rate of said illumination source is based at least in part upon a signal from said at least one sensor.

* * * * *